D. E. Hayward,

Shoe Uppers,

No. 2,771. Reissued Oct. 8, 1867.

Witnesses:

Sam. Cooper

P. E. Eschenmacher

Inventor:

D. E. Hayward.

N. PETERS, PHOTO-LITHOGRAPHER, WASHINGTON, D. C.

UNITED STATES PATENT OFFICE.

JOHN ASHTON GREENE, OF BROOKLYN, NEW YORK, ASSIGNEE, BY MESNE ASSIGNMENTS, OF DANIEL E. HAYWARD, ASSIGNOR TO ALFRED B. ELY AND CHARLES WILD, TRUSTEES.

IMPROVEMENT IN HEEL-STIFFENERS.

Specification forming part of Letters Patent No. 40,409, dated October 27, 1863; re'ssue No. 2,771, dated October 8, 1867.

DIVISION B.

*To all whom it may concern:*

Be it known that DANIEL EDWIN HAYWARD, of Melrose, in the county of Middlesex and State of Massachusetts, has invented an Improved Heel-Stiffener or Counter for Boots and Shoes, of which the following is a full, clear, and exact description, reference being had to the accompanying drawings making part of this specification, in which—

Figure 2:
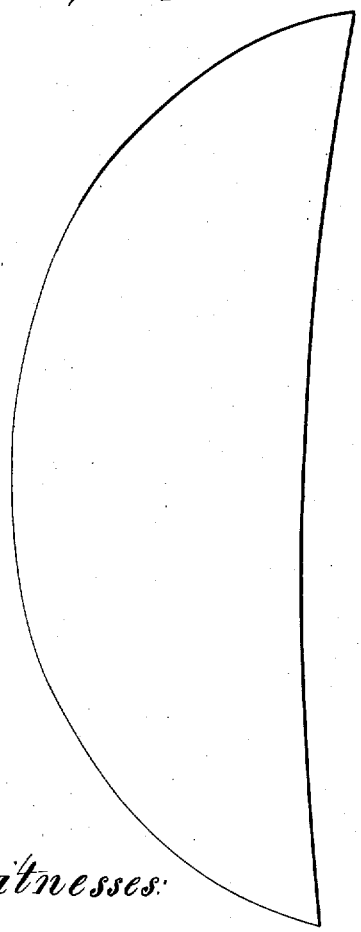
Figure 1:
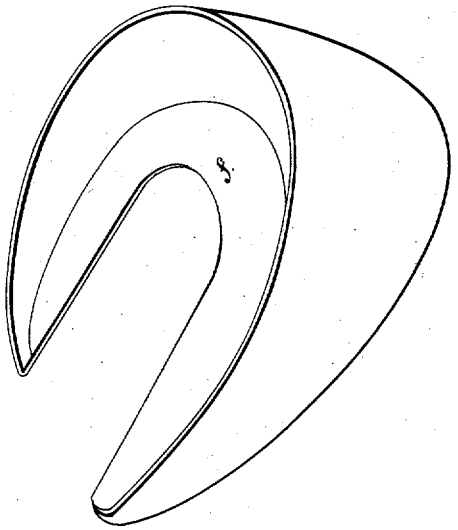

Figure 1 is a perspective view of the improved heel-stiffener. Fig. 2 is an elevation of the piece of sheet-rubber of which it is made.

Heel-stiffeners or counters have heretofore been made of leather, but this material is costly, and the labor required to cut them out and skive them is considerable. The chief objection, however, to which they are liable arises from the time and labor required to apply them to the boot. After being cut out and skived, they are temporarily secured to the last and lining, and then bent round and crimped over upon the inner sole, and secured there. This must be done while the stiffener is wet and pliable.

The leather stiffener is also liable to the objection that it will lose its resiliency if bent out of shape when wet, and will not return to its original form, and thus the boot wears over to one side.

The cheap substitutes for leather which have been employed for stiffeners—such as pasteboard and factitious leather—are valueless.

Heel-stiffeners have been made of sheet-rubber, which has been cut, crimped, folded, and cemented over the shoe while in course of construction. This is expensive, and no claim is, therefore, laid to any such stiffeners.

In the manufacture of the improved stiffener, any suitable compound of india-rubber is employed which, when vulcanized, will have the required stiffness combined with the necessary resiliency. This compound, after being ground upon the ordinary heated rolls, is spread in a sheet of from one-eighth to one-tenth of an inch in thickness upon cotton or other cloth, the thickness of the sheet and of the cloth varying with the size of the required stiffener. Pieces, Fig. 2, are then cut from the sheet of cloth and rubber, of the required size, which are placed in a mold and vulcanized, the cloth being thrown upon the inside of the stiffener, and the mold being of a form that shall give it the required shape, Fig. 1, the part *f*, which goes beneath the heel, being of the exact form ultimately required, so that when applied to the boot or shoe, it is simply necessary to put it in place, no wetting, crimping, bending, or temporary nailing being required.

When the upper-leather and sole are applied, the stitches, nails, or pegs that hold them together also pass through the part *f* of the stiffener in the ordinary manner. This stiffener, also, is permanently resilient, even when wet, and does not lose its form or shape, however long or severe the wear to which it is exposed.

This stiffener may be placed outside the leather, if preferred.

The proportions which are preferred are as follows: Eight pounds crude rubber; two pounds litharge; one pound white lead; one pound lamp-black; four pounds calcined plaster; six ounces flour of sulphur. This compound, after being thoroughly ground upon the ordinary heated rolls and placed in the molds, is vulcanized by exposure for ten hours, or thereabout, to a temperature of 275° Fahrenheit.

I do not, however, wish to confine myself to any particular compound, or to any particular length of time for vulcanizing the same.

What is claimed as the invention of the said HAYWARD, as a new article of manufacture, is—

A heel-stiffener or counter of india-rubber and its compounds, which is shaped and vulcanized in the mold in which it is formed, and made as set forth, for the purpose described.

In witness whereof I hereby sign the above specification for reissue of patent of D. E. HAYWARD for heel-stiffenings.

JOHN ASHTON GREENE.

Witnesses:

W. M. PARKER,

A. B. ELY.